Dec. 22, 1953     K. A. HOLLINGSWORTH     2,663,111
FISH LURE GUARD
Filed Jan. 14, 1950
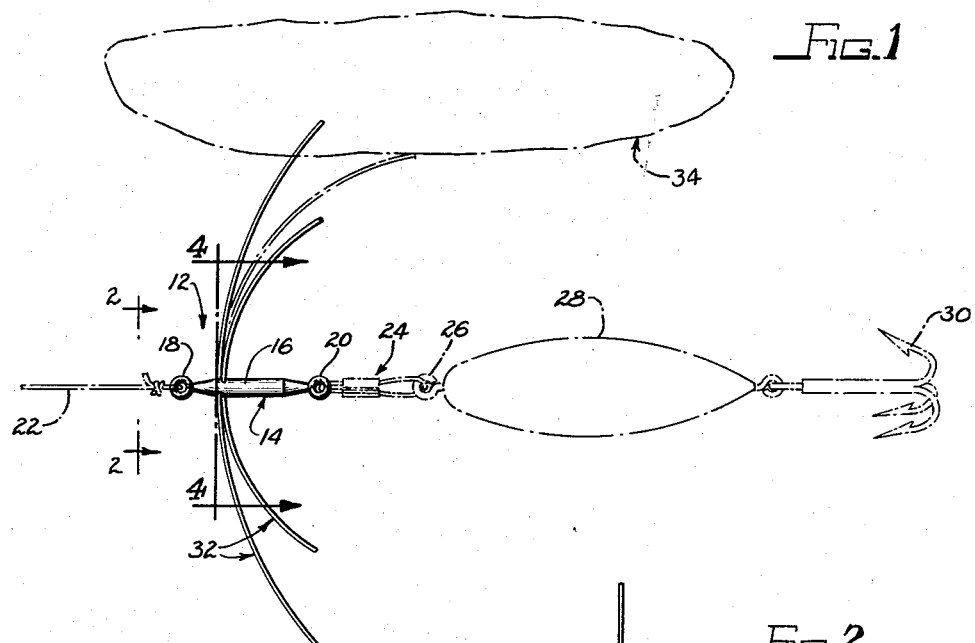
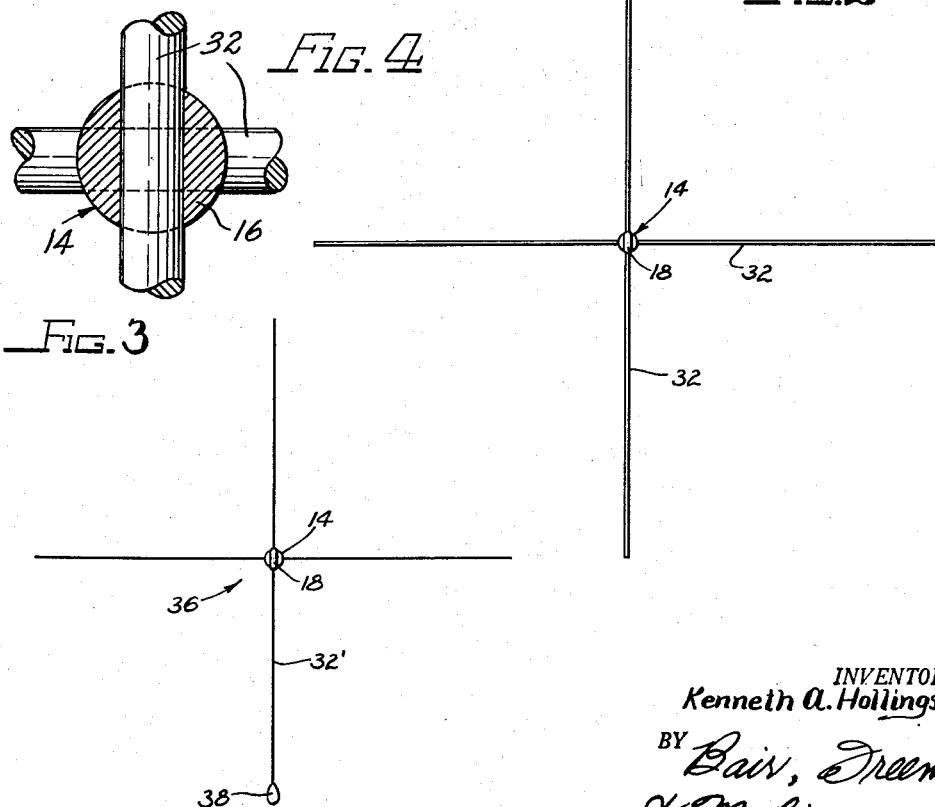
INVENTOR.
Kenneth A. Hollingsworth
BY Bair, Freeman & Molinare Attys.

Patented Dec. 22, 1953

2,663,111

UNITED STATES PATENT OFFICE 2,663,111

FISH LURE GUARD

Kenneth A. Hollingsworth, Cedar Rapids, Iowa

Application January 14, 1950, Serial No. 138,641

2 Claims. (Cl. 43—42.4)

This invention relates to guards for fish lures and, more particularly, to guards effective for preventing the fish hook from becoming snagged with rocks and weeds.

The guard of the present invention is effective for deflecting the fish hook from rocks and weeds as distinguished from a protective shield that covers the fish hook. The guard consists essentially of a central member and a plurality of generally radially extending wire fingers of substantial length. The device is adapted for connection with the leading end of a lure and is constructed so that the lure and the hook are spaced from the guard.

An object of the invention is the provision of a guard of the character referred to in which the fingers are long and possess considerable resiliency so that the fingers readily react against a rock or other obstacle for deflecting the entire lure from the obstacle.

Another object is the provision of a novel guard which, because of its special construction, can be connected with a fish lure and the fish lure remains entirely in the open so that the fish can readily strike without interference from the guard.

Still another object is the provision of a guard having the advantages above referred to which can be used with any kind of lure, spinner or bait.

A further object of the invention is the provision of a novel guard having radial fingers of substantial length which serve to stabilize the device in the water and prevent twisting thereof and of the fishing line due to incidental twisting of the lure.

Still another object is the provision of a guard that is light in weight and relatively small in mass so that it does not detract the fish from the lure.

A further object is the provision in a modified form of the invention of a weighted member secured to one of the fingers which thereby acts as a keel for preventing twisting of the device.

With these and other objects in view, my invention consists in the construction, arrangement and combination of the various parts of my device whereby the objects contemplated are attained, as hereinafter more fully set forth, pointed out in the claims and illustrated in the accompanying drawings, in which:

Figure 1 is a side view of the guard of the present invention;

Figure 2 is an end view of the left of Figure 1;

Figure 3 is a small scale view similar to Figure 2 illustrating a modified form of the invention; and Figure 4 is an enlarged cross-section view taken substantially on line 4—4 of Figure 1.

Referring now in detail to the drawing, the guard is indicated as a whole at 12 and includes a central plug or mounting member 14, which in the preferred shape is elongated and of relatively small diameter. The plug 14 includes a shank portion 16 having an eyelet 18 at one end and an eyelet 20 at the other end. The member 14 may be formed by any preferred method of manufacture and preferably is of stainless steel. The eyelet 18 is adapted for connection with a leader or fishing line 22, and the eyelet 20 is adapted for connection of a fish lure. It will be understood, of course, that the end having the eyelet 18 is the leading end with respect to the reeling-in direction of movement. A clasp 24 is fastened to the eyelet 20 and also to an eyelet 26 on a lure or body member 28. At the rear or trailing end of the body 28 is a fish hook 30. Only the guard 12 itself is shown in full lines because the guard forms the device of the present invention and the fishing lure and hook are shown in dotted lines to bring out more clearly that the guard can be used with any kind of fish hook or lure.

The numeral 32 refers to spring fingers mounted in the shank portion 16 of the member 14. The fingers 32 are disposed generally radially of the member 14 and in the present instance are four in number, which I have found the preferred number, as more clearly illustrated in Figure 2. The fingers are disposed at right angles to one another, but the particular angles and the number of fingers is not critical.

Each two fingers 32 that are disposed diametrically opposite each other constitute a single wire. The shank portion 16 is provided with diametrically arranged holes offset axially with respect to each other, and the wires making up the fingers 32 are inserted in the holes and secured therein by a press fit. The fingers 32 are also preferably of stainless steel.

The main component of the fingers 32 is radial, i. e., the fingers lie closely adjacent a plane disposed perpendicular to the longitudinal dimension of the member 14 but as illustrated in Figure 1, the fingers curve rearwardly at their outer ends to an extent that is relatively small as compared with the length of the fingers. In other words, the outer extremities of the fingers 32 are spaced rearwardly only a short distance from the plane above referred to. Preferably, the fingers 32 are substantially completely within the projected confines of the length of the member 14 and do not extend axially beyond the member.

Because of the size and shape of the fingers 32, it will be evident that the fish hook 30 is disposed entirely in the open, that is, it is spaced a substantial distance from any portion of the fingers 32 and the fish can strike the hook without any interference from the fingers.

The fingers 32 are of substantial length relative to the length of the complete rig which includes the member 14, body 28 and hook 30. It is appreciated that fish hooks and lures vary in length but for any particular type of fishing the lures are generally within a particular range of sizes and for each particular type of fishing the guard 12 can be of the desired size relative to the lure. The object is that the spring fingers 32 have substantial radial length relative to the complete rig in the case of each type of fishing.

The numeral 34 indicates generally a rock or other obstacle imbedded in the water. In the reeling-in operation of the fish lure, the fingers 32 are effective for preventing snagging of the fish hook with the rock or other obstacle. If the lure should approach the obstacle 34, the fingers 32 on engaging the rock will be deflected or bent to a position such as that illustrated in dotted lines, the bending being caused by the motion of the lure through the water. The bending is only momentary and after the bending has been effected, the energy stored up in the fingers causes the fingers to immediately tend to move to their full line position. The resumption of their original shape by the fingers deflects the whole device away from the obstacle and because of the substantially great length of the fingers relative to the length of the whole rig, the whole rig is deflected sufficiently far from the obstacle so that the hook 30 avoids the obstacle. The generally radial disposition of the fingers effectively prevents their being bent down into close proximity to the lure and this feature is distinguished from those devices in which the main component, or a substantial component, of the fingers is axial. The greater the distance that the fingers are bent from their normal position, the greater is the action of the fingers to deflect the entire rig from the obstacle.

Because of the relatively great length of the fingers 32, the fish hook 30 is prevented from being disposed close to an obstacle. It is not only necessary that the hook be prevented from snagging an obstacle, but it is desirable that it be moved far enough away from the obstacle that the fish can readily strike.

It will be evident from the above that the fingers in no way interfere with the fish hook, and the fish hook therefore is not directly shielded from obstacles, but instead of being shielded, it is deflected out of its normal course and prevented from tangling with obstacles.

The length and resiliency of the fingers provide an impetus to skip, that is, the lure is not merely urged out of its otherwise normal course, but is abruptly moved out of position where it would snag obstacles.

Another advantage of the invention has to do with such formations as tree crotches imbedded in the water. If the lure is drawn through such a tree crotch, the fingers 32 because of their length, resiliency and generally radial disposition, cause the device to ride up to a wide part in the crotch, carrying the lure and fish hook therewith, whereupon the whole device passes through a wide part in the crotch and the hook is prevented from snagging with the obstacle.

The guard 12 is exceedingly light in weight and is sufficiently light that the lure can be made to float or sink according to the usual means employed for that purpose without material hindrance from the guard. The guard 12 is small, that is, its mass is small, with the result that the fish would not be attracted to the guard instead of to the lure.

Another advantage of the device resulting from the great length of the fingers 32 is that any tendency of the lure to spin or rotate the guard 12 is resisted by the reaction of the water against the fingers. Considerably more force is required to rotate a device having radially long fingers than is required in the case of radially short fingers. Prevention of twisting action of the guard, of course, prevents twisting of the line. It is not intended that the guard be effective for preventing spinning of a lure that is deliberately intended to spin, but only incidental spinning or twisting that it is desirable to have avoided.

Figure 3 shows a guard 36 which in all respects is like the guard 12 except that a lead weight 38 is secured to the outer extremity of one of the fingers 32'. The weight 38 may be of other material besides lead, and in its preferred form is merely a knob or ball secured to the finger. The weight 38 tends to retain the finger to which it is secured in downwardly extending position thereby resisting any tendency to twisting of the guard. The weight may be added to the guard for the purpose of greater stabilization of the guard as referred to above.

While I have herein shown and described a preferred embodiment of my invention, manifestly it is capable of modification and rearrangement of parts without departing from the spirit and scope thereof. I do not, therefore, wish to be understood as limiting this invention to the precise form herein disclosed, except as I may be so limited by the appended claims.

I claim as my invention:

1. In a device of the character disclosed, an elongated central member adapted for connection at its forward end to a line and at its rearward end to a fish lure, and a plurality of generally radially extending spring wire fingers secured to said member, the length of each of said fingers from its point of securement, to said central member, to the extended end thereof being much greater than the length of said central member, pairs of said fingers extending diametrically opposite each other and being formed of a single wire press fitted in a hole in said central member, said fingers lying closely adjacent a plane perpendicular to said central member, and the outer ends of said fingers being curved rearwardly from said plane, with respect to the reeling-in direction of movement of the device, to a minor extent relative to the length of the fingers, said fingers being disposed substantially entirely within the projected confines of the length of said central member, whereby all portions of said fingers are located forwardly of said fish lure, and said fingers being effective for substantially preventing twisting and rotation of the device due to incidental twisting of the lure.

2. A fish lure guard comprising a central axial member adapted for connection at the forward end thereof to a line and at the rearward end to a fish lure, a plurality of generally radially extending fingers of spring wire material secured to said member adjacent the forward end thereof, the length of each of said fingers from its point of securement, to said central member, to the extended end thereof being much greater than the length of said central member, said fingers lying closely adjacent a plane perpendicular to the longitudinal axis of said central member, the outer ends of said fingers being curved rearwardly from said plane to a minor extent relative to the length of the fingers, said fingers being disposed substantially entirely within the projected limits of the length of said central member, whereby all portions of said fingers are located forwardly of said fish lure, and a weight at the outer extremity of only one of said fingers.

KENNETH A. HOLLINGSWORTH.

References Cited in the file of this patent

UNITED STATES PATENTS

| Number | Name | Date |
|---|---|---|
| 798,575 | Eastman | Aug. 29, 1905 |
| 824,739 | Phelps | July 3, 1906 |
| 1,215,938 | Jay | Feb. 13, 1917 |
| 1,313,567 | Ulrich | Aug. 19, 1919 |
| 2,231,949 | Rinehart | Feb. 18, 1941 |